United States Patent
Le Blevennec et al.

(10) Patent No.: US 11,099,328 B2
(45) Date of Patent: Aug. 24, 2021

(54) OPTICAL COUPLER

(71) Applicant: Commissariat à l'Énergie Atomique et aux Énergies Alternatives, Paris (FR)

(72) Inventors: Gilles Le Blevennec, Grenoble (FR); Marianne Consonni, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 16/699,514

(22) Filed: Nov. 29, 2019

(65) Prior Publication Data

US 2020/0174196 A1    Jun. 4, 2020

(30) Foreign Application Priority Data

Nov. 30, 2018 (FR) .................................. 1872150

(51) Int. Cl.
*G02B 6/32* (2006.01)
*G02B 6/35* (2006.01)
*G02B 6/42* (2006.01)

(52) U.S. Cl.
CPC ............. *G02B 6/327* (2013.01); *G02B 6/352* (2013.01); *G02B 6/4206* (2013.01)

(58) Field of Classification Search
CPC .......... G02B 6/327; G02B 6/352; G02B 6/35; G02B 6/4206; G02B 6/42; G02B 6/26; G02B 6/04; G02B 6/4298; G02B 19/00; G02B 6/262; G02B 19/0028

USPC ........................ 385/27–28, 31–33, 39, 43, 50
See application file for complete search history.

(56) References Cited

U.S. PATENT DOCUMENTS

| | | | | |
|---|---|---|---|---|
| 4,114,592 A * | 9/1978 | Winston | ................ | F24S 23/12 126/683 |
| 5,192,863 A * | 3/1993 | Kavehrad | ............ | G02B 6/4202 250/227.24 |
| 5,301,249 A * | 4/1994 | Hamblen | ............. | G02B 6/4204 359/858 |
| 8,457,456 B2 * | 6/2013 | Kopp | ..................... | G02B 6/264 385/29 |

FOREIGN PATENT DOCUMENTS

| | | |
|---|---|---|
| EP | 1 739 468 A1 | 1/2007 |
| FR | 2 362 408 A1 | 3/1978 |
| WO | WO 01/75492 A2 | 10/2001 |
| WO | WO 02/04858 A2 | 1/2002 |

OTHER PUBLICATIONS

Preliminary Search Report for French Application No. 1872150, dated Sep. 11, 2019.

* cited by examiner

*Primary Examiner* — Michael P Mooney
(74) *Attorney, Agent, or Firm* — Wolf, Greenfield & Sacks, P.C.

(57) ABSTRACT

An optical coupler including a first surface intended to receive a light beam and a second surface intended to supply at least part of the light beam, and a lateral wall connecting the first surface to the second surface, the lateral wall successively including, between the first and second surfaces, a first concave portion and a first convex portion.

29 Claims, 8 Drawing Sheets

OPTICAL COUPLER

This application claims priority to French patent application number FR1872150, the content of which is hereby incorporated by reference in its entirety to the maximum extent allowable by law.

TECHNICAL BACKGROUND

The present disclosure generally concerns optical couplers.

PRIOR ART

An optical coupler is a coupling device enabling to guide light from an input surface, receiving light supplied by a light supply device, to an output surface, supplying the light transmitted to a light reception device. The coupler is characterized by the fact that the dimensions of the input surface and of the output surface are different.

As an example, the light supply device may comprise an extensive light source, for example, a light-emitting diode, a lamp, or the sun, may comprise a bundle of optical fibers conveying light. As an example, the light reception device may correspond to a bundle of optical fibers, to a photovoltaic cell, or to a sensor.

For certain applications, the ratio of the area of the input surface to the area of the output surface should be large as compared with the unit. This is particularly true when the coupler plays the role of a concentrator. It may then be difficult to form an optical coupler which substantially has no losses, that is, for which substantially all the light rays reaching the input surface escape from the output surface.

SUMMARY

There is a need for an optical coupler having a large ratio of its input surface area to its output surface area with respect to the unit, and which is substantially lossless and which has a simple structure.

An embodiment also provides an optical coupler comprising a first surface intended to receive a light beam and a second surface intended to supply at least part of the light beam, and a lateral wall connecting the first surface to the second surface, the lateral wall successively comprising, between the first and second surfaces, a first concave portion and a first convex portion.

According to an embodiment, the optical coupler further comprises, between the first and second surfaces, a second concave portion, the first convex portion being interposed between the first concave portion and the second concave portion.

According to an embodiment, the optical coupler further comprises, between the first and second surfaces, a second convex portion, the second concave portion being interposed between the first convex portion and the second convex portion.

According to an embodiment, the optical coupler further comprises, between the first and second surfaces, a third concave portion, the second convex portion being interposed between the second and third concave portions.

According to an embodiment, the areas of the cross-sections of the first and second surfaces are different.

According to an embodiment, the coupler has a symmetry of revolution.

According to an embodiment, the ratio of the area of the first surface to the area of the second surface is in the range from 10 to 300.

According to an embodiment, the first and second surfaces are parallel.

According to an embodiment, the first and second surfaces are planar.

According to an embodiment, the first and second surfaces each have a radius in the range from 1 mm to 100 mm.

An embodiment also provides an optoelectronic device comprising an optical coupler such as previously defined and a waveguide in contact with the second surface.

According to an embodiment, the waveguide comprises a bundle of optical fibers.

An embodiment also provides a method of manufacturing an optical coupler comprising a first surface intended to receive a light beam and a second surface intended to supply at least part of the light beam, and a lateral wall connecting the first surface to the second surface, the lateral wall successively comprising, between the first and second surfaces, a first concave portion and a first convex portion, the method comprising the steps of:

a) determining, for a first profile of the lateral wall, the position along the axis of the first profile of the point at which a light ray escapes from the coupler through the lateral wall; and b) determining a second profile by modifying the first profile by drawing away the lateral wall from the axis at said position with respect to the first profile.

According to an embodiment, the first profile is a tapered profile.

According to an embodiment, steps a) and b) are repeated at least twice, the second profile obtained at the first iteration of step b) being used as a first profile at the second iteration of step a).

The foregoing and other features and advantages will be discussed in detail in the following non-limiting description of specific embodiments in connection with the accompanying drawings.

DESCRIPTION OF THE EMBODIMENTS

Figure 1:
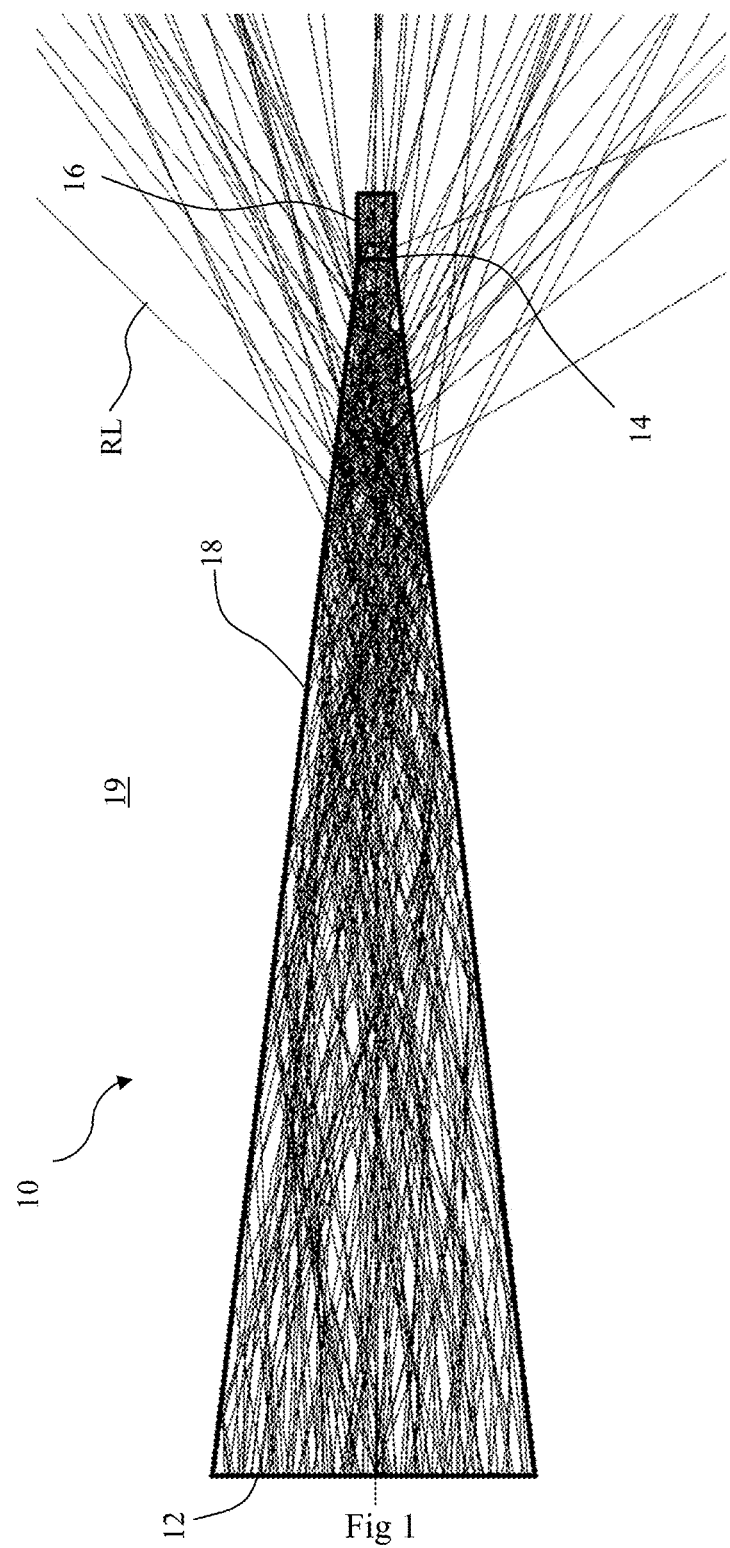
FIG. 1 illustrates the propagation of light rays in a tapered optical coupler with losses.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and are detailed. The terms "about", "approximately", "substantially", and "in the order of" are used herein to designate a tolerance of plus or minus 10%, preferably of plus or minus 5%, of the value in question.

In the following description, the term useful radiation designates the electromagnetic radiation to be transmitted by the optical coupler and the term refraction index of a material designates the refraction index of the material at the wavelength of the useful radiation. As an example, it may be a radiation in the visible spectrum, infrared, or microwaves. When the useful radiation is not a monochromatic radiation, the refraction index of the material corresponds to the average refraction index over the wavelength range of the useful radiation. In the following description, the expression "an element mainly made of a material" means that said element comprises more than 50% by volume of said material, preferably more than 80% by volume, more preferably more than 90% by volume.

To form an optical coupler having a simple structure and having circular input and output surfaces with different radiuses, it may be envisaged to use a tapered optical coupler with a circular base. However, the inventors have shown that, particularly when the ratio of the input surface area to the output surface area is large as compared with the unit, particularly greater than 20, preferably greater than 50, more preferably greater than 70, a tapered optical coupler may exhibit significant optical losses.

FIG. 1 is a partial simplified cross-section view showing a tapered optical coupler 10 with a circular base comprising an input surface 12 and an output surface 14 in contact with a cylindrical waveguide 16 having a circular base. Coupler 10 comprises a tapered lateral wall 18, in contact with an outside medium 19, for example, air, connecting input surface 12 to output surface 14. FIG. 1 shows the paths of light rays determined by simulation in the case where the radius of input surface 12 is 20 mm, the radius of output surface 14 is 2.5 mm and the length of optical coupler 10, measured along its axis, is 140 mm. Further, for the simulations, coupler 10 and waveguide 16 are made of poly (methyl methacrylate) (PMMA) and outside medium 19 around coupler 10 and waveguide 16 is air. As appears in FIG. 1, certain light rays RL escape from coupler 10 before reaching waveguide 16. In the present example, the optical losses, which correspond to the difference between the unit and the ratio of the optical power delivered by output surface 14 to the optical power delivered by input surface 12, are in the order of 65%.

Figure 2:
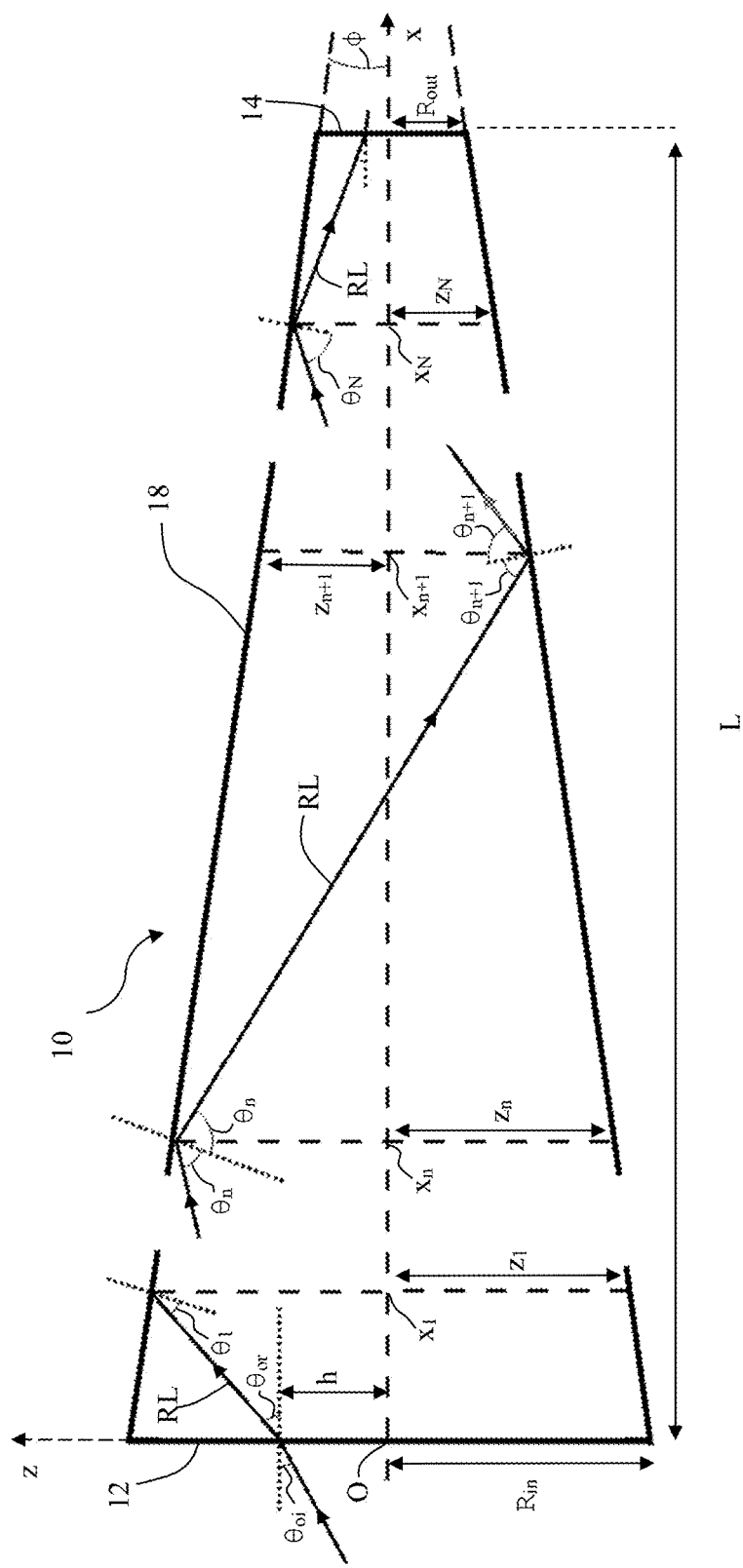
FIG. 2 is a partial simplified cross-section view of an example of a tapered optical coupler.

FIG. 2 is a partial simplified cross-section view of a tapered coupler 10, illustrating geometric parameters of coupler 10. Coupler 10 corresponds to a frustum having a circular base. It is considered that coupler 10 has a homogeneous structure in a material having a refraction index n1 and that at least the tapered lateral wall 18 of coupler 10 is in contact with an outer medium having refraction index n2. The outside medium preferably corresponds to air.

A reference frame (Oxz) having as an origin O the center of input surface 12 is defined in the cross-section plane, axis (Ox) corresponding to the axis of revolution of the frustum and axis (Oz) being perpendicular to axis (Ox) and located in the cross-section plane of FIG. 2. According to an embodiment, surfaces 12 and 14 are planar and parallel. The path of a light ray RL in coupler 10 has been shown in FIG. 2.

Further, call:

$R_{in}$ the radius of input surface 12 of coupler 10;
$R_{out}$ the radius of output surface 14 of coupler 10;
L the length of the frustum measured along axis (Ox);
$\phi$ the half-angle at the top of coupler 10;
h the height of input ray RL measured along axis (Oz);
$\theta_{0i}$ the initial angle of incidence of the incident light ray RL reaching input surface 12; and
$\theta_{0r}$ the initial refraction angle of the light ray RL refracted by input surface 12 in optical coupler 10.

According to an embodiment, each of radiuses $R_{in}$ and $R_{out}$ is greater than 10 times the wavelength of the useful radiation and preferably greater than 1 mm, preferably in the range from 1 mm to 100 mm. As an example, radius $R_{in}$ is in the range from 10 mm to 30 mm and radius $R_{out}$ is in the range from 1 mm to 5 mm.

Input surface 12 is intended to receive a light beam. It may be a light beam directly emitted by a light source, a light beam emitted by a light source through an optical system, for example comprising a lens, or a light beam transmitted by a waveguide, for example comprising a bundle of optical fibers. The incident light beam may be a diverging beam, a converging beam, or a collimated beam, that is, a beam having substantially parallel rays. According to an embodiment, an optical system, for example, an elliptic lens, may be placed against input surface 12. In this case, it is possible for input surface 12 not to correspond to a real interface between two mediums having different refraction indexes and the initial angle of incidence $\theta_{0i}$ and the initial refraction angle $\theta_{0r}$ are then equal. Generally, when input surface 12 is not planar, radius $R_{in}$ corresponds to the radius of the circular cross-section of the coupler at the junction between input surface 12 and lateral wall 18. Similarly, when output surface 14 is not planar, radius $R_{out}$ corresponds to the radius of the circular cross-section of the coupler at the junction between output surface 14 and lateral wall 18.

The half-angle $\phi$ at the top of the frustum is linked to the other parameters of the frustum by the following relation 1):

$$\phi = \mathrm{arc}tg\left(\frac{R_{in} - R_{out}}{L}\right) \quad \text{[Math 1]}$$

The concentration factor of coupler 10 is equal to the ratio of the area of input surface 12 to the area of output surface 14 and is thus equal to ratio $(R_{in}/R_{out})^2$. According to an embodiment, the concentration factor is in the range from 10 to 300, preferably from 50 to 100.

The angle of incidence of radius RL, when radius RL reaches lateral tapered wall 18, corresponds to the angle between the direction perpendicular to wall 18 and radius RL. According to the path of radius RL, the latter may be totally reflected a plurality of times on wall 18. The angle of incidence $\theta_n$ at the reflection of rank n of radius RL on wall 18 is provided by the following relation 2):

$$\theta_n = \theta_1 - 2(n-1)\phi \qquad \text{[Math 2]}$$

Relation 2) shows that angle of incidence $\theta_n$ decreases at each reflection with respect to the previous reflection.

Call $x_1$ and $z_1$ respectively the position measured along axis (Ox) and the height measured along axis (Oz) of the first total reflection on wall 18 of the light ray RL entering through input surface 12 with height h and initial refraction angle $\theta_{0r}$. Position $x_1$ is provided by the following relation 3):

$$x_1 = \frac{L(R_{in} - h)}{R_{in} - R_{out} + L\tan\theta_{0r}} \qquad \text{[Math 3]}$$

Height $z_1$ is provided by the following relation 4):

$$z_1 = h + x_1 \tan\theta_{0r} \qquad \text{[Math 4]}$$

Generally, the position $x_n$ measured along axis (Ox) of the total reflection of rank n of light ray RL on wall 18 is provided by the following recurrence relation 5), for any natural integer n greater than or equal to 1:

$$x_{n+1} - x_n = \frac{2z_n \tan(\theta_n - \Phi)}{1 + \tan\phi\tan(\theta_n - \Phi)} \qquad \text{[Math 5]}$$

Further, the height $z_n$ measured along axis (Oz) of the total reflection of rank n of light ray RL on wall 18 is provided by the following recurrence relation 6), for any natural integer n greater than or equal to 1:

$$z_{n+1} - z_n = (x_n - x_{n+1})\tan\phi \qquad \text{[Math 6]}$$

A first condition for coupler 10 to have no optical losses is for each reflection of light ray RL on tapered lateral wall 18 to be a total reflection. For the reflection of rank n, n being an integer greater than or equal to 1, of light ray RL at the point of coordinates $(x_n, z_n)$ to be total, the angle of incidence $\theta_n$ of radius RL on lateral tapered wall 18 at the reflection of rank n has to be greater than a limiting refraction angle $\theta_{lim}$ provided by the following relation 7):

$$\theta_{lim} = \arcsin\left(\frac{n2}{n1}\right) \qquad \text{[Math 7]}$$

As an example, when coupler 10 is made of PMMA, having a refraction index for visible light of approximately 1.49, and the outside medium is air, limiting refraction angle $\theta_{lim}$ is equal to approximately 42°.

Figure 3:
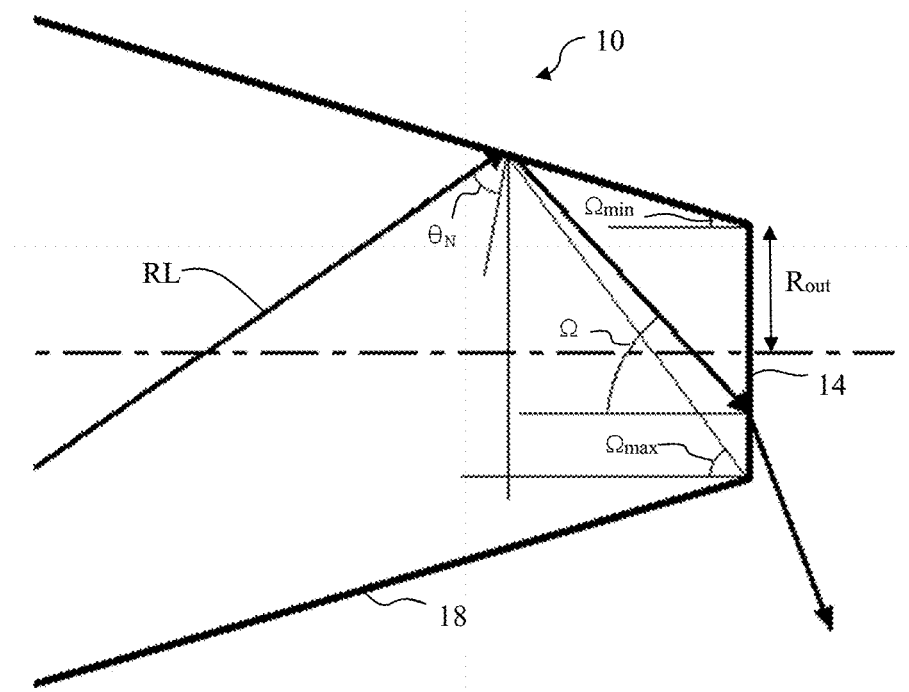
FIG. 3 illustrates the conditions of extraction of the light rays in the air at the output of a tapered optical coupler.

FIG. 3 is a partial simplified cross-section view which illustrates second conditions for coupler 10 to have no optical losses in the case where output surface 14 is in contact with the medium of index n2. To have no total reflection of ray RL on output surface 14, the angle of incidence $\Omega$ of light ray RL on output surface 14 has to be smaller than the previously-described limiting angle of incidence $\theta_{lim}$. This implies the following relation 8) for the angle of incidence $\theta_N$ at the last total reflection of rank N before ray RL reaches output surface 14:

$$\theta_N > \frac{\pi}{2} \cdot \theta_{lim} + \phi \qquad \text{[Math 8]}$$

After the reflection of rank N, for light ray RL to effectively reach output surface 14, angle of incidence $\theta_N$ further has to verify the following inequalities 9):

$$\frac{\pi}{2} + \phi - \Omega_{max} \leq \theta_N \leq \frac{\pi}{2} + \phi - \Omega_{min} \qquad \text{[Math 9]}$$

Angle $\Omega_{min}$ is provided by the following relation 10):

$$\Omega_{min} = \arctan\left(\frac{z_N - R_{out}}{L - x_N}\right) \qquad \text{[Math 10]}$$

Angle $\Omega_{max}$ is provided by the following relation 11):

$$\Omega_{max} = \arctan\left(\frac{z_N + R_{out}}{L - x_N}\right) \qquad \text{[Math 11]}$$

Figure 4:
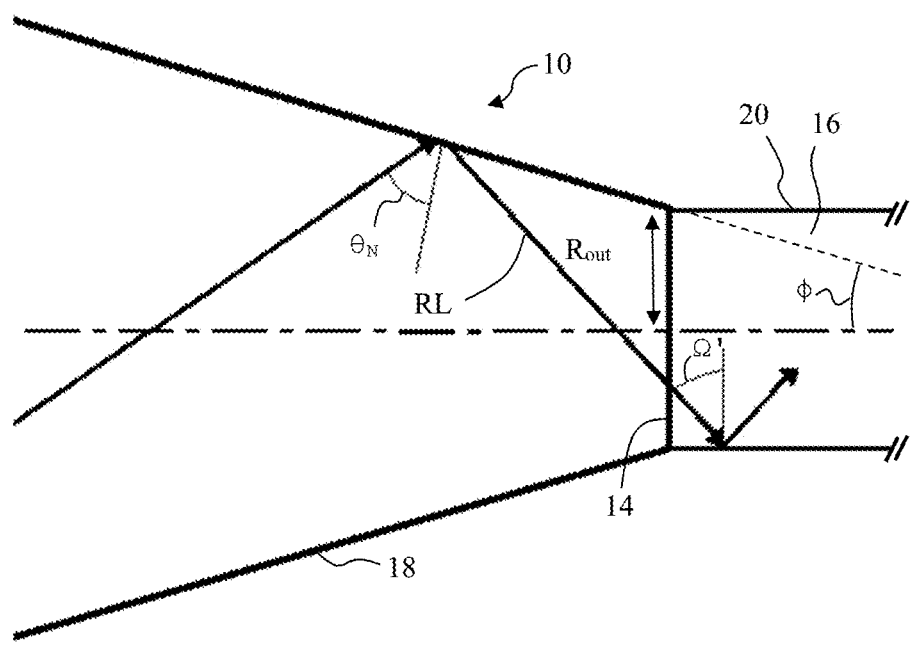
FIG. 4 illustrates the conditions of extraction of the light rays in a waveguide at the output of a tapered optical coupler.

FIG. 4 is a partial simplified cross-section view illustrating the second condition in the case where output surface 14 is in contact with a cylindrical waveguide 16 having the same refraction index as that of optical coupler 10 and having a lateral wall 20 corresponding to a cylinder with a circular base of radius $R_{out}$. In practice, particularly to obtain a waveguide 16 having the desired mechanical properties, particularly a sufficient flexibility, waveguide 16 may correspond to a bundle of parallel optical fibers each having a radius smaller than $R_{out}$, the bundle of fibers being inscribed within a cylinder having a circular base of radius $R_{out}$. However, since the optical fibers arranged in a bundle behave from an optical point of view substantially in the same way as a single optical fiber having the same radius as the bundle, it is considered hereafter that waveguide has a monoblock structure 16.

Light ray RL has to penetrate into waveguide 16 while respecting the condition of total reflection on the lateral wall 20 of waveguide 16 so that the lossless propagation of light ray RL continues in waveguide 16. To have a total reflection of ray RL on lateral wall 20 of waveguide 16, the angle of incidence $\Omega'$ of light ray RL on lateral wall 20 has to be greater than the previously-described limiting angle $\theta_{lim}$. This implies the following relation 12) for the angle of incidence $\theta_N$ at the last total reflection of rank N before ray RL reaches output surface 14:

$$\theta_N > \theta_{lim} + \phi \qquad \text{[Math 12]}$$

Angle of incidence $\theta_N$ should further verify the previously-described inequalities 9).

As soon as the ratio of the input radius to the output radius is high, there appears that the constraints imposed to the dimensions of tapered coupler 10 are significant to allow a lossless transmission of a ray RL having an initial angle of incidence $\theta_{0i}$.

Figure 5:
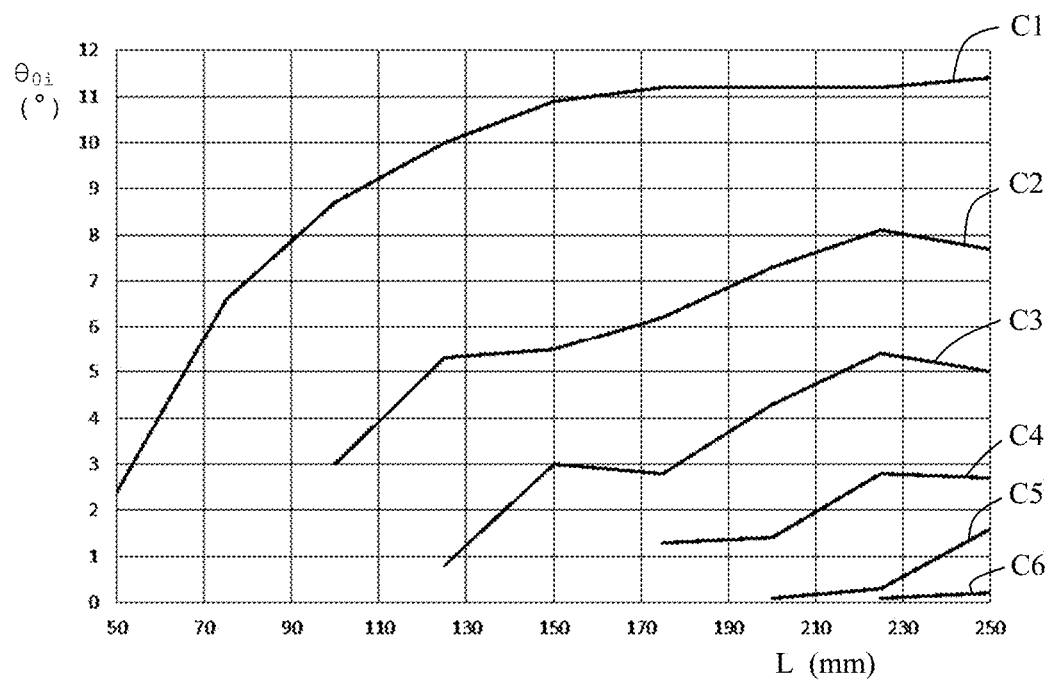
FIG. 5 shows curves of the variation of the maximum initial angle of incidence of light rays in a lossless tapered optical coupler according to the length of the optical coupler for a plurality of ratios of the input radius to the output radius of the coupler.

FIG. 5 shows curves C1, C2, C3, C4, C5, and C6 of the variation of the maximum initial angle of incidence $\theta_{0i}$ of a light ray RL transmitted with no loss by tapered coupler 10 according to length L of tapered coupler 10 for ratios $R_{in}/R_{out}$ respectively equal to 4, 5, 6, 7, 8, and 9. Curves C1 to C5 have been obtained by considering a tapered coupler 10 made of PMMA having its output surface 14 in contact with air, with a radius $R_{out}$ equal to 2.5 mm, and with a height h equal to $R_{in}$-0.1 mm. As appears in the drawing, the maximum initial angle of incidence $\theta_{0i}$ strongly decreases as soon as the ratio of the area of input surface 12 to the area of output surface 14 is large, particularly, greater than 20 (which corresponds to a ratio $R_{in}/R_{out}$ greater than approximately 4.5).

In the following description, call profile P of the coupler the function which, associates with each position x of axis (Ox) the height z of the lateral wall of the optical coupler at position x. For a tapered coupler, profile P corresponds to a straight line, that is, an affine-type function.

The inventors have shown that the lossless transmission performance of the optical coupler may be improved by using a profile obtained by modifying the tapered profile. More particularly, in a plane containing the coupler axis, the lossless transmission performance of the optical coupler may be improved by providing at least one ripple on the profile with respect to the tapered profile, that is, the profile successively passes below the tapered profile and then above the tapered profile.

Figure 6:
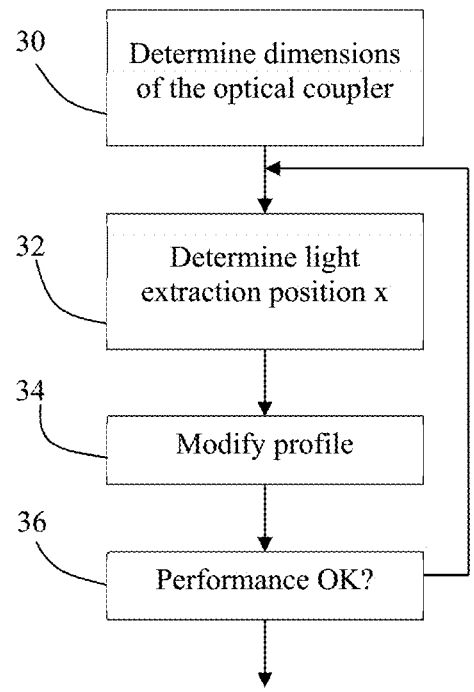
FIG. 6 is a block diagram of an embodiment of an optical coupler forming method.

FIG. 6 is a block diagram of an embodiment of a method of forming an optical coupler.

At step 30, the desired dimensions $R_{in}$, $R_{out}$, and L of the optical coupler are particularly determined by taking bulk constraints into account. The method carries on at step 32.

At step 32, the propagation of light rays in the optical coupler, particularly in the most unfavorable cases, that is, generally for the light ray RL having the maximum desired initial angle of incidence $\theta_{0i}$ and the maximum desired height h, is determined by simulation This enables to determine the position $x_K$ at which the light ray escapes from the coupler by crossing the lateral wall of the coupler, that is, the position $x_K$ at which the condition of total reflection is not fulfilled. At the first occurrence of step 32, the profile $P_0$ used is a tapered profile, that is, the straight line running through the point of coordinates (0, $R_{in}$) and point (L, $R_{out}$). The method carries on at step 34.

At step 34, a new profile $P_1$ is determined by modifying the previous profile $P_0$ used at step 32 by forming a ripple at the level of position $x_K$ so that the height $P_1(x_K)$ of profile $P_1$ at position $x_K$ is greater than the height $P_0(x_K)$ of the tapered profile at position $x_K$, for example, by 10% and that, at a position $x_L$ between origin O and position $x_K$, the height $P_1(x_L)$ of profile $P_1$ at position $x_L$ is smaller than the height $P_0(x_L)$ of the previous profile at position $x_L$, for example, in successive steps of 1% until the curvature of profile $P_1$ at position $x_K$ enables to obtain a total reflection around position $x_K$. According to an embodiment, position $x_L$ is in the range from 60% to 90% of position $x_K$. The forming of a ripple in the profile comprising a convex portion at the level of position $x_K$ preceded with a concave portion is thus obtained. The method carries on at step 36.

The term convex portion means that the profile delimits a portion of the coupler where all the points of a segment of a straight line which joins any two points of its surface also belong to the coupler. On the contrary, the term concave portion means that the profile delimits a portion of the coupler where all the points of a segment of a straight line which joins any two points of its surface, in a plane containing the coupler axis, do not belong to the coupler.

At step 36, it is determined whether the optical performance of the new profile $P_1$ is satisfactory. As an example, it may be determined by simulation whether all the rays RL corresponding to the most unfavorable cases propagate in the optical coupler all the way to output surface 14. If this is true, the method ends. If, at step 36, it is determined that the optical performance of the new profile $P_1$ is not satisfactory, for example, if the rays RL in the most unfavorable cases keep on escaping from the optical coupler before reaching output surface 14, at a position in the range from $x_K$ to L, the method carries on at step 32, using profile $P_1$ as the previous profile.

Figure 7:
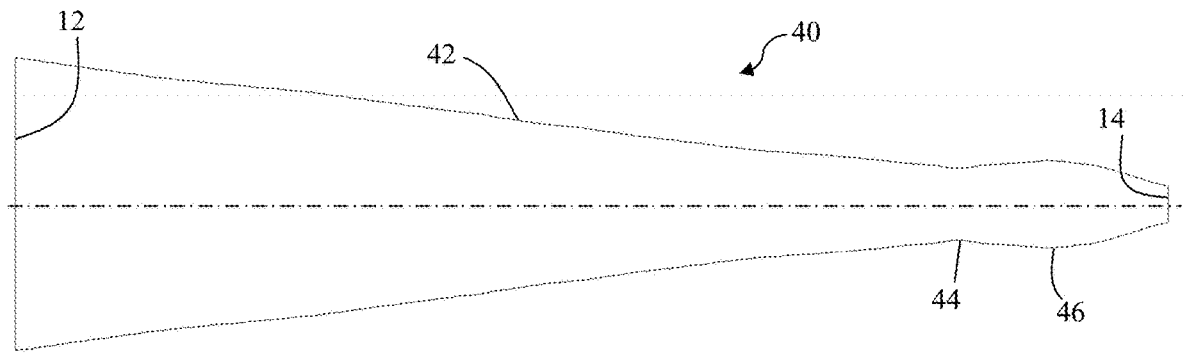
FIG. 7 is a partial simplified cross-section view of an embodiment of an optical coupler comprising a ripple.
Figure 8:
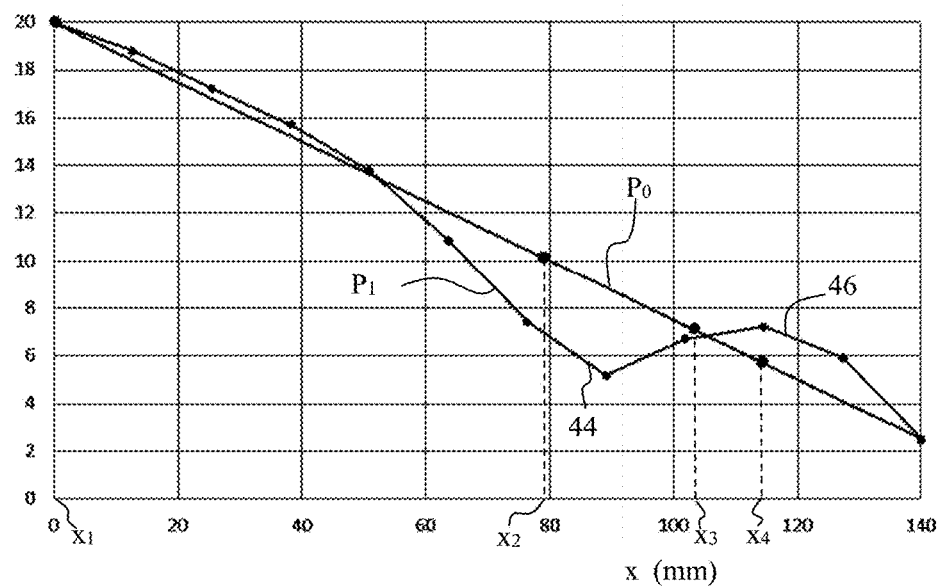
FIG. 8 shows a curve of the variation of the profile of the optical coupler of FIG. 7 and a curve of the variation of the corresponding tapered profile.

FIG. 7 is a partial simplified cross-section view of an embodiment of an optical coupler 40 and FIG. 8 shows a curve $P_1$ of the variation of the profile of the optical coupler 40 and a curve $P_0$ of the variation of the corresponding tapered profile, profile $P_1$ having been obtained by the implementation of the previously-described method. The simulations have been performed with a coupler made of PMMA having a radius $R_{in}$ of 20 mm, an output radius $R_{out}$ of 2.5 mm, and a length L of 140 mm. For such simulations, the most unfavorable case corresponds to an incident ray arriving at a height h equal to $R_{in}$-0.05 mm with an initial angle of incidence $\theta_{0i}$ equal to 100. Positions $x_1$, $x_2$, $x_3$ correspond to the abscissas of the points of reflection of the incident light ray on tapered profile $P_0$ and position $x_4$ corresponds to the abscissa of the point of tapered profile $P_0$ at the level of which the light ray escapes from tapered profile $P_0$.

Coupler 40 comprises all the elements of coupler 10, with the difference that the tapered lateral wall 18 connecting input surface 12 to output surface 14 of coupler 10 is replaced with a lateral wall 42 of profile $P_1$ connecting input surface 12 to the output surface 14 of same length L and comprising, successively along axis (Ox), a concave portion 44 thinner than tapered wall 18 and a convex portion 46 thicker than tapered wall 18, portions 44 and 46 forming a ripple.

Figure 9:
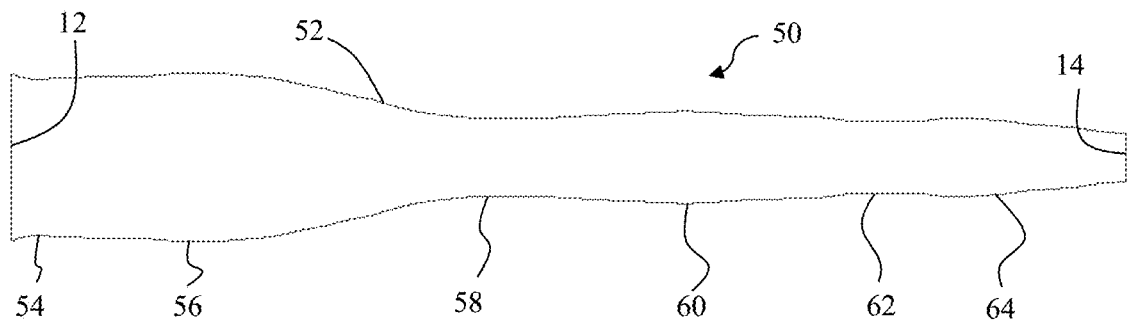
FIG. 9 is a simplified cross-section view of an embodiment of an optical coupler, comprising a plurality of ripples.
Figure 10:
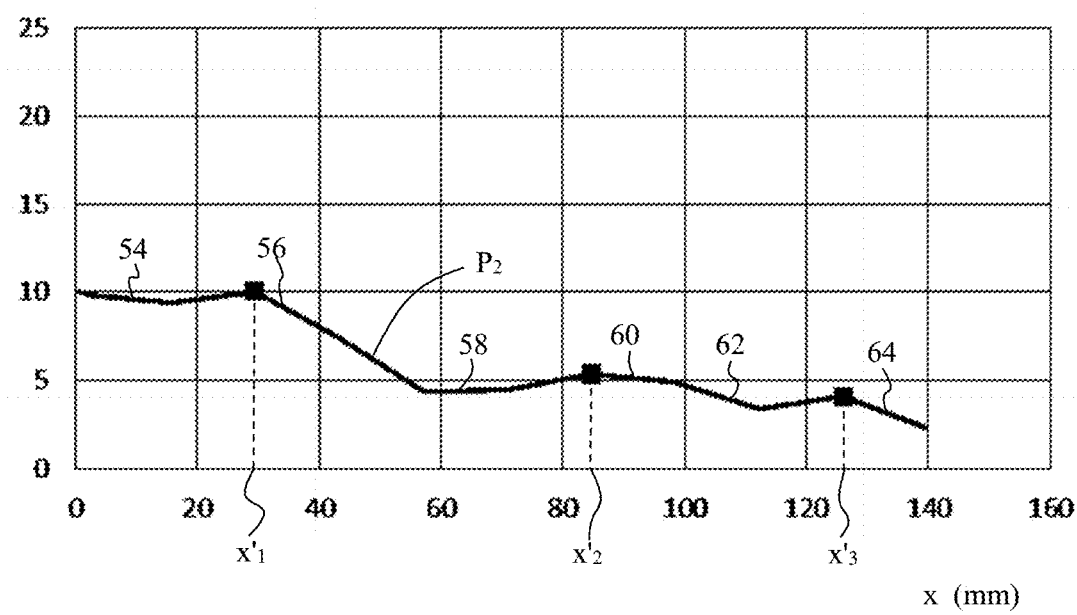
FIG. 10 shows a curve of the variation of the profile of the optical coupler of FIG. 9.

FIG. 9 is a partial simplified cross-section view of another embodiment of an optical coupler 50 and FIG. 10 shows a curve $P_2$ of the variation of the profile of coupler 50, profile $P_2$ having been obtained by the implementation of the previously-described method. The simulations have been performed with a coupler made of PMMA having a radius $R_{in}$ of 10 mm and an output radius $R_{out}$ of 2.5 mm, and a length L of 140 mm. For such simulations, the most unfavorable case corresponds to an incident ray arriving at a height h equal to $R_{in}$-3.3 mm with an initial angle of incidence $\theta_{0i}$ equal to 450. Position $x'_1$ corresponds to the abscissa of the point of the tapered profile resting on the same input and output surfaces, at the level of which the light ray escapes from the tapered profile. Position $x'_2$ corresponds to the abscissa of the point of the modified profile, obtained after a first implementation of the previously-described steps 32, 34, and 36, at the level of which the light ray escapes from the modified profile. Position $x'_3$ corresponds to the abscissa of the point of the profile which has been modified again, obtained after a second implementation of the previously-described steps 32, 34, and 36, at the level of which the light ray escapes from the profile which has been modified again.

Coupler 50 comprises all the elements of coupler 10, with the difference that the tapered lateral wall 18 coupling input surface 12 to output surface 14 of coupler 10 is replaced with a lateral wall 52 connecting input surface 12 to the output surface 14 of same length L and comprising, successively along axis (Ox), a concave portion 54, a convex portion 56, a concave portion 58, a convex portion 60, a concave portion 62, and a convex portion 64.

Figure 11:
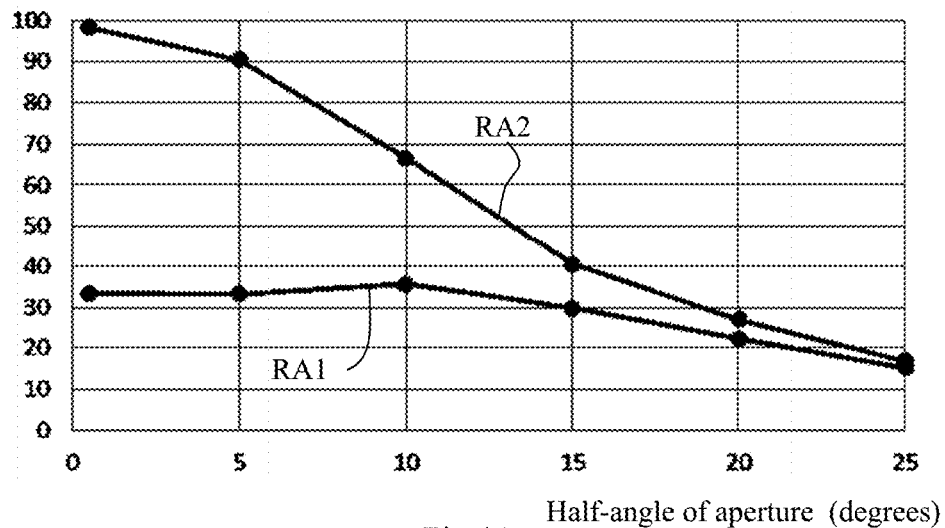
FIG. 11 shows curves of the variation of the transmission efficiency of the optical coupler according to the half-angle of aperture of the light source, respectively for a tapered optical coupler and for the optical coupler of FIG. 7.

FIG. 11 shows curves RA1 and RA2 of the variation of the transmission efficiency of the optical coupler according to the half-angle of aperture of the light source, respectively for tapered optical coupler 10 (curve RA1) and for the optical coupler 40 shown in FIG. 7 (curve RA2) comprising a single ripple. The half-angle of aperture of the light source which illuminates the input surface 12 of the optical coupler is equal to the previously-described initial angle of incidence $\theta_{0i}$. As appears in the drawing, a transmission gain is obtained for optical coupler 40 over tapered optical coupler 10 up to half angles of aperture greater than 25°.

Figure 12:
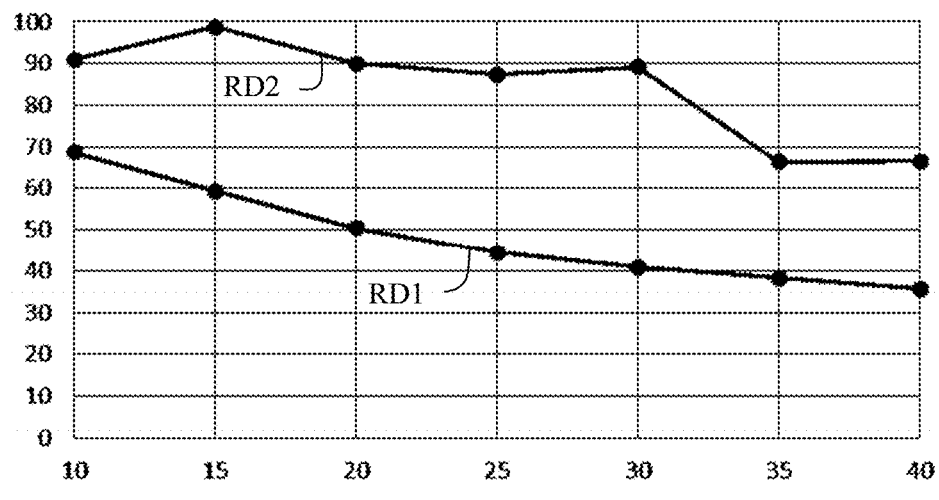
FIG. 12 shows curves of the variation of the transmission efficiency of the optical coupler according to the diameter of the light source, respectively for a tapered optical coupler and for the optical coupler of FIG. 7.

FIG. 12 shows curves RD1, RD2 of the variation of the transmission efficiency of the optical coupler according to the diameter of the light source respectively for a tapered optical coupler 10 (curve RD1) and for the optical coupler 40 shown in FIG. 7 (curve RD2) comprising a single ripple. As appears in the drawing, a transmission gain is obtained for optical coupler 40 over tapered optical coupler 10, whatever the diameter of the light source.

The optical coupler advantageously has a simple shape and may be easily manufactured, for example, by molding or by machining. The optical coupler may be made of any type of material at least partially transparent to the useful radiation, for example PMMA, polycarbonate, or silicone.

Further, the previously-described embodiments of the optical coupler implementing the principles of geometrical optics, the performance of the optical coupler does not vary when the dimensions of the optical coupler are modified by homothety. This means that the performance determined for an optical coupler profile of given dimensions is the same as that determined for an optical coupler having the same profile, enlarged or decreased to another scale.

Figure 13:
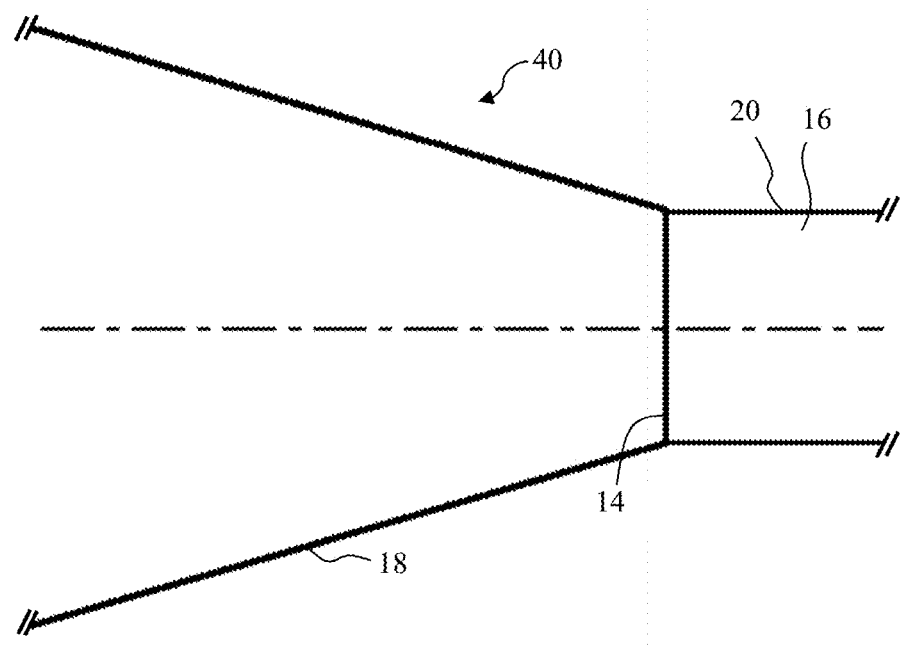
FIGS. 13 and 14 are partial simplified cross-section views of an embodiment of an optical coupler with a waveguide
Figure 14:
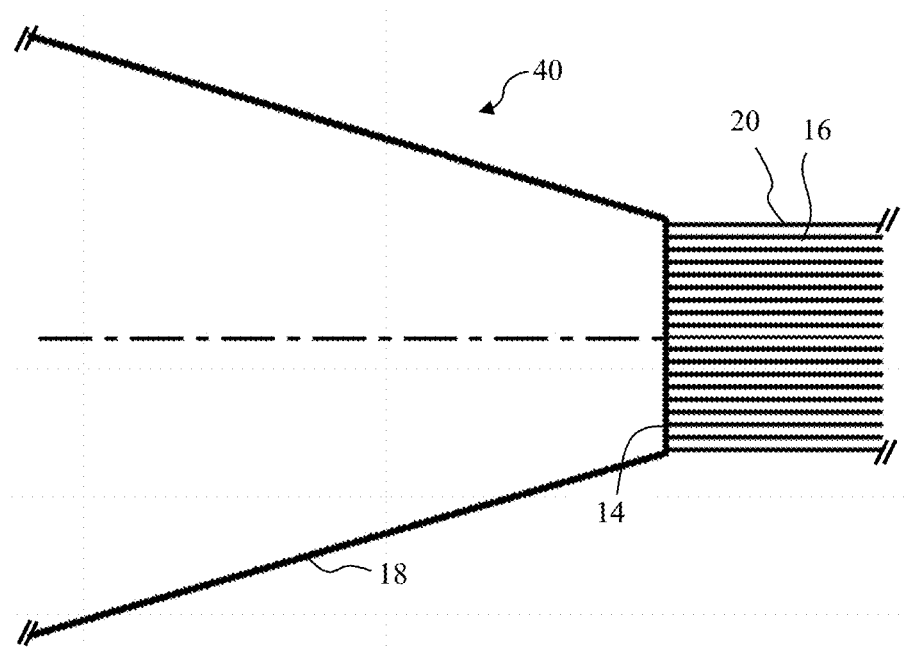

An embodiment where the output surface 14 of the optical coupler is in contact with a waveguide 16 made of the same material as the coupler has been described. FIGS. 13 and 14 each show optical coupler 40 with waveguide 16. In FIG. 14, waveguide 16 corresponds to a bundle of parallel optical fibers. It should however be clear that waveguide 16 may be made of a material different from that of the coupler, for example, a material having a refraction index n3. In this case, there are three limiting angles $\theta_{lim1}$, $\theta_{lim2}$, and $\theta_{lim3}$ to be taken into account, given by the following relations 13), n1 being greater than n3 and n3 being greater than n2:

$$\theta_{lim1} = \arcsin\left(\frac{n2}{n1}\right),$$ [Math 13]

$$\theta_{lim2} = \arcsin\left(\frac{n3}{n1}\right),$$

$$\theta_{lim3} = \arcsin\left(\frac{n2}{n3}\right)$$

Limiting angle $\theta_{lim1}$ corresponds to the previously-described limiting angle $\theta_{lim}$ at the interface between the optical coupler and the outside medium, for example, air. Limiting angle $\theta_{lim2}$ corresponds to the limiting angle at the interface between the optical coupler and waveguide 16. Limiting angle $\theta_{lim3}$ corresponds to the limiting angle at the interface between waveguide 16 and the outside medium, for example, air.

An example of application of the previously-described optical coupler concerns a surgical operation, particularly a surgical operation implementing infrared fluorescence markers. For such a surgical operation, a visible light source and an infrared light source may be used and a camera for the acquisition of images in visible light and a camera for the acquisition of infrared images may be used. The previously-described optical coupler may be used during the guiding of the visible and/or infrared light emitted by the sources towards a scene to be illuminated and/or on guiding of the visible and/or infrared light of the illuminated scene towards the cameras.

Various embodiments and variations have been described. It will be understood by those skilled in the art that certain features of these various embodiments and variations may be combined, and other variations will occur to those skilled in the art. Embodiments have been previously described, where output surface 14 is planar at the contact of air. It should be clear that output surface 14 may have a different shape, particularly to increase the extraction of light. According to an embodiment, output surface 14 may be curved, for example, convex or concave. According to another embodiment, a texturing may be provided on output surface 14 to increase the diffusion of light, which texturing may comprise the forming of raised areas on output surface 14 having maximum dimensions in the range from 0.5 µm to 50 µm. Further, in the previously-described embodiments, the optical coupler has a symmetry of revolution. It should however be clear that the optical coupler may have a different shape, particularly a straight cylindrical structure obtained from a profile determined as previously described. Finally, the practical implementation of the described embodiments and variations is within the abilities of those skilled in the art based on the functional indications given hereabove. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of manufacturing an optical coupler comprising a first surface intended to receive a light beam and a second surface intended to supply at least part of the light beam, and a lateral wall connecting the first surface to the second surface, the lateral wall successively comprising, between the first and second surfaces, a first concave portion and a first convex portion, the method comprising the steps of:
   a) determining, for a first profile of the lateral wall, the position along the axis of the first profile of the point at which a light beam escapes from the coupler through the lateral wall; and
   b) determining a second profile by modifying the first profile by drawing away the lateral wall from the axis at said position with respect to the first profile.

2. The method of claim 1, wherein the first profile is a tapered profile.

3. The method of claim 1, wherein steps a) and b) are repeated at least twice, the second profile obtained at the first iteration of step b) being used as the first profile at the second iteration of step a).

4. The method of claim 1, further comprising, between the first and second surfaces, a second concave portion, the first convex portion being interposed between the first concave portion and the second concave portion.

5. The method of claim 4, further comprising, between the first and second surfaces, a second convex portion, the second concave portion being interposed between the first convex portion and the second convex portion.

6. The method of claim 5, further comprising, between the first and second surfaces, a third concave portion, the second convex portion being interposed between the second and third concave portions.

7. The method of claim 1, wherein the areas of the cross-sections of the first and second surfaces are different.

8. The method of claim 1, wherein the coupler has a symmetry of revolution.

9. The method of claim 1, wherein the ratio of the area of the first surface to the area of the second surface is in the range from 10 to 300.

10. The method of claim 1, wherein the first and second surfaces are parallel.

11. The method of claim 1, wherein the first and second surfaces are planar.

12. The method of claim 1, wherein the first and second surfaces each have a radius in the range from 1 mm to 100 mm.

13. An optical coupler comprising a first surface intended to receive a light beam and a second surface intended to supply at least part of the light beam, and a lateral wall connecting the first surface to the second surface, the lateral wall successively comprising, between the first and second surfaces, a first concave portion and a first convex portion;
the optical coupler being manufactured by a method comprising the steps of:
a) determining, for a first profile of the lateral wall, the position along the axis of the first profile of the point at which a light beam escapes from the coupler through the lateral wall; and
b) determining a second profile by modifying the first profile by drawing away the lateral wall from the axis at said position with respect to the first profile;
the optical coupler further comprising, between the first and second surfaces, a second concave portion, the first convex portion being interposed between the first concave portion and the second concave portion;
the optical coupler further comprising, between the first and second surfaces, a second convex portion, the second concave portion being interposed between the first convex portion and the second convex portion;
the optical coupler further comprising, between the first and second surfaces, a third concave portion, the second convex portion being interposed between the second and third concave portions.

14. The optical coupler of claim 13, wherein the areas of the cross-sections of the first and second surfaces are different.

15. The optical coupler of claim 13, wherein the coupler has a symmetry of revolution.

16. The optical coupler of claim 13, wherein the ratio of the area of the first surface to the area of the second surface is in the range from 10 to 300.

17. The optical coupler of claim 13, wherein the first and second surfaces are parallel.

18. The optical coupler of claim 13, wherein the first and second surfaces are planar.

19. The optical coupler of claim 13, wherein the first and second surfaces each have a radius in the range from 1 mm to 100 mm.

20. An optoelectronic device comprising an optical coupler comprising a first surface intended to receive a light beam and a second surface intended to supply at least part of the light beam, and a lateral wall connecting the first surface to the second surface, the lateral wall successively comprising, between the first and second surfaces, a first concave portion and a first convex portion,
the optical coupler being manufactured by a method comprising the steps of:
a) determining, for a first profile of the lateral wall, the position along the axis of the first profile of the point at which a light beam escapes from the coupler through the lateral wall; and
b) determining a second profile by modifying the first profile by drawing away the lateral wall from the axis at said position with respect to the first profile,
the optoelectronic device further comprising a waveguide in contact with the second surface, wherein the waveguide comprises a bundle of optical fibers.

21. The optical coupler of claim 20, further comprising, between the first and second surfaces, a second concave portion, the first convex portion being interposed between the first concave portion and the second concave portion.

22. The optical coupler of claim 20, further comprising, between the first and second surfaces, a second convex portion, the second concave portion being interposed between the first convex portion and the second convex portion.

23. The optical coupler of claim 20, further comprising, between the first and second surfaces, a third concave portion, the second convex portion being interposed between the second and third concave portions.

24. The optical coupler of claim 20, wherein the areas of the cross-sections of the first and second surfaces are different.

25. The optical coupler of claim 20, wherein the coupler has a symmetry of revolution.

26. The optical coupler of claim 20, wherein the ratio of the area of the first surface to the area of the second surface is in the range from 10 to 300.

27. The optical coupler of claim 20, wherein the first and second surfaces are parallel.

28. The optical coupler of claim 20, wherein the first and second surfaces are planar.

29. The optical coupler of claim 20, wherein the first and second surfaces each have a radius in the range from 1 mm to 100 mm.

* * * * *